United States Patent
Pullini et al.

(10) Patent No.: US 7,353,700 B2
(45) Date of Patent: Apr. 8, 2008

(54) TIRE WEAR MONITORING SYSTEM

(75) Inventors: Daniele Pullini, Orbassano (IT); Piero Perlo, Sommariva Bosco (IT)

(73) Assignee: C.R.F. Società Consortile per Aziono, Orbassanô (Turin) (IT)

( * ) Notice: Subject to any disclaimer, the term of this patent is extended or adjusted under 35 U.S.C. 154(b) by 0 days.

(21) Appl. No.: 10/573,920

(22) PCT Filed: Sep. 29, 2004

(86) PCT No.: PCT/IB2004/003171

§ 371 (c)(1),
(2), (4) Date: Mar. 30, 2006

(87) PCT Pub. No.: WO2005/032856

PCT Pub. Date: Apr. 14, 2005

(65) Prior Publication Data

US 2007/0035386 A1    Feb. 15, 2007

(30) Foreign Application Priority Data

Oct. 3, 2003    (IT) .......................... TO2003A0776

(51) Int. Cl.
*G01M 17/02* (2006.01)
(52) U.S. Cl. .................................................. 73/146
(58) Field of Classification Search .................. 73/146
See application file for complete search history.

(56) References Cited

U.S. PATENT DOCUMENTS

| | | | |
|---|---|---|---|
| 4,157,530 A * | 6/1979 | Merz | 340/445 |
| 4,510,484 A | 4/1985 | Snyder et al. | |
| 5,559,437 A * | 9/1996 | Baccaud et al. | 324/240 |
| 6,973,824 B2 * | 12/2005 | Giustino et al. | 73/146 |
| 2003/0010107 A1 * | 1/2003 | Giustino et al. | 73/146 |
| 2003/0159503 A1 * | 8/2003 | Mancuso et al. | 73/146 |

FOREIGN PATENT DOCUMENTS

| | | |
|---|---|---|
| DE | 44 02 136 | 7/1995 |
| DE | 197 45 734 | 4/1999 |
| DE | 102 53 278 | 6/2004 |
| DE | 102 59 056 | 9/2004 |
| EP | 0 937 615 | 8/1999 |
| EP | 1 314 580 | 5/2003 |

* cited by examiner

Primary Examiner—Andre J. Allen
(74) Attorney, Agent, or Firm—Nixon & Vanderhye P.C.

(57) ABSTRACT

Tire wear monitoring system, including a wearing part (110, 111) to be monitored, said wearing part (110, 111) being associated with magnetic elements (113) and magnetic field sensing means (114), for sensing an intensity of a magnetic field emitted by said magnetic elements (113), associated to said wearing part (113) of said tire. According to the invention, said magnetic field sensing means (114) for sensing an intensity of a magnetic field emitted by said magnetic elements (113) are associated with a wheel to which said tire belongs.

25 Claims, 5 Drawing Sheets

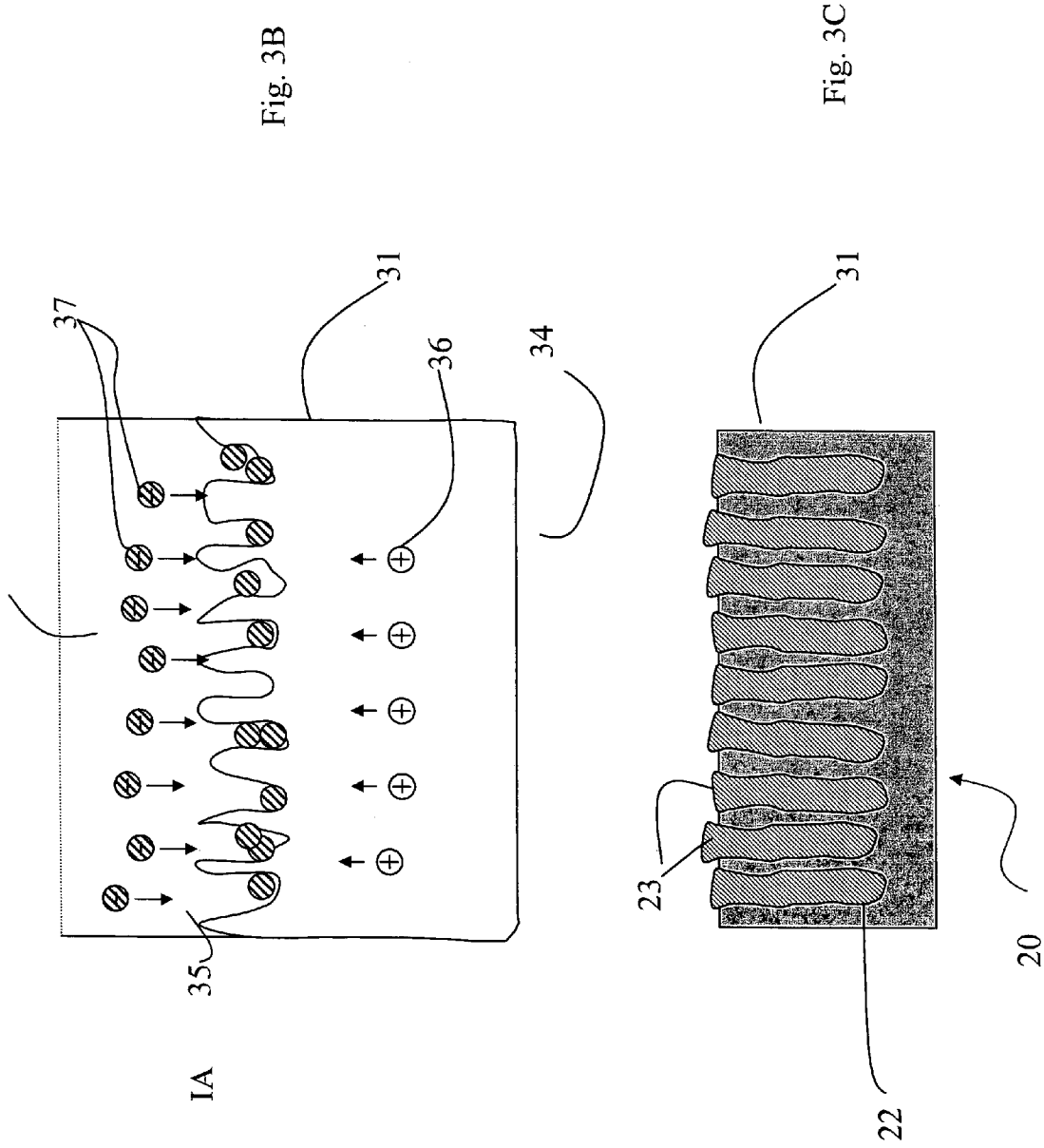

US 7,353,700 B2

TIRE WEAR MONITORING SYSTEM

This application is the US national phase of international application PCT/IB2004/003171 filed 29 Sep. 2004 which designated the U.S. and claims benefit of IT TO2003A000776, dated 3 Oct. 2003, the entire content of which is hereby incorporated by reference.

The present invention relates to a tire wear monitoring system, of the type including a tire comprising a wearing part to be monitored, said wearing part being associated with magnetic elements and magnetic-field sensing means, for sensing an intensity of a magnetic field emitted by said magnetic elements, associated with said wearing part of said tire.

In the field of tires wear monitoring systems is known, for example from the French patent application FR-A-2816887, to operate through by a multiple system of magnetic sensors, capable of measuring the magnetic field produced by a certain quantity of magnetic particles which are incorporated in the tire body itself during the manufacturing method, or subsequently.

The incorporated particles are small permanent, miniaturized magnets which can be part of the original compound of the tire.

A drawback of such a monitoring system is the location of the magnetic field sensor, which is usually placed on the suspension or in the interior of the fender, or even on a proper arm. The sensor then lies at a certain distance from the magnetized tread and therefore has sensitivity and interference problems due to the distance.

The present invention aims to carrying out a solution suitable for manufacturing a monitoring system for monitoring the tire wear, provided with high sensitivity and robust against to electromagnetic interferences.

According to the present invention, this object is attained thank to a monitoring system for the monitoring of the tire wear and a corresponding manufacturing method, having the features defined in a specific way in the following claims.

The invention will be described with reference to the enclosed drawings, which are given by mere way of not limiting example, wherein:

FIGS. 3A, 3B and 3C represent manufacturing steps of a magnetic field sensing, device suitable for being employed in the monitoring system according to the invention;

The proposed tire wear monitoring system provides for inserting some magnetic particles in regions of the tire tread and for directly locating on the wheel, in particular in the rim or the tire itself, magnetic field sensing devices. According to another aspect of the invention, magnetic field sensing devices are proposed, particularly suitable for being located on the rim or in the wheel tire.

Figure 1:
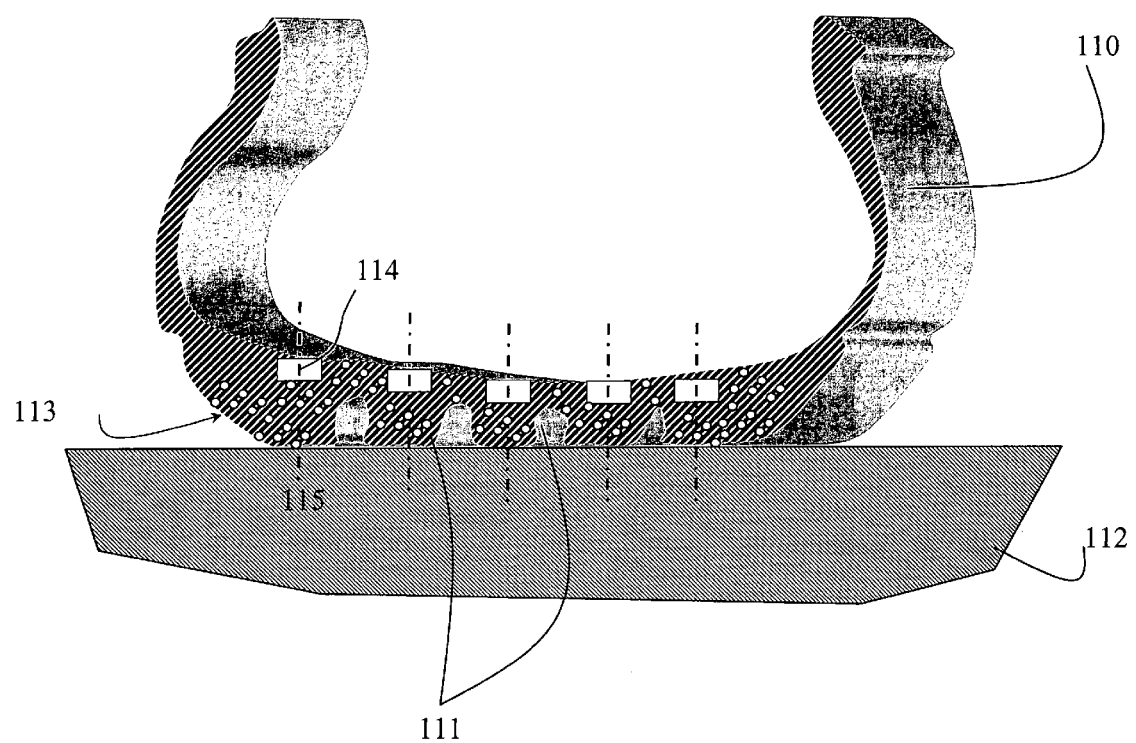
FIG. 1 represents a basic diagram of the monitoring system according to the invention.

In FIG. 1, a principle diagram of the proposed tire wear monitoring system is shown, which includes a tire tread generally indicated by numeral 110, contacting with a road surface shown by numeral 112. The tread is the part substantially subjected to the tire wear.

Blocks ill of such a tread 110 are further shown in the contact region with the road surface 112.

The tread includes insertions of magnetic particles 113 which, in the embodiment shown in FIG. 1, are only distributed in the blocks 111 forming the tread 110.

Alternatively, the magnetic particles 113 may be substantially distributed in a homogeneous way in the tire compound.

Such magnetic particles 113 are small permanent miniaturized magnets which can be part of the original compound of the tire. Such composite compound of rubber and magnetic particles is cured within a tire-shaped mold in the presence of a magnetic field properly oriented.

Some magnetic field sensing devices 114 are directly embedded in the tread 110 and are then located very close to the magnetic particles 113.

The magnetic field sensing devices 114 are of an analog type, so their response is a function of the intensity of the magnetic field to be measured.

The magnetic field sensing devices 114 in FIG. 1 are shown located close to the tire points of which the wear has to be measured, by pointing out wearing anomalies along the circumference of the tread 110.

Section axes 115 of the blocks 111 of the tread are particularly shown in FIG. 1. The magnetic field sensing devices 114 measure the intensity variation of the magnetic field along the sections shown by the axes 115, by providing in this way an information about the wheels convergence.

Figure 2:
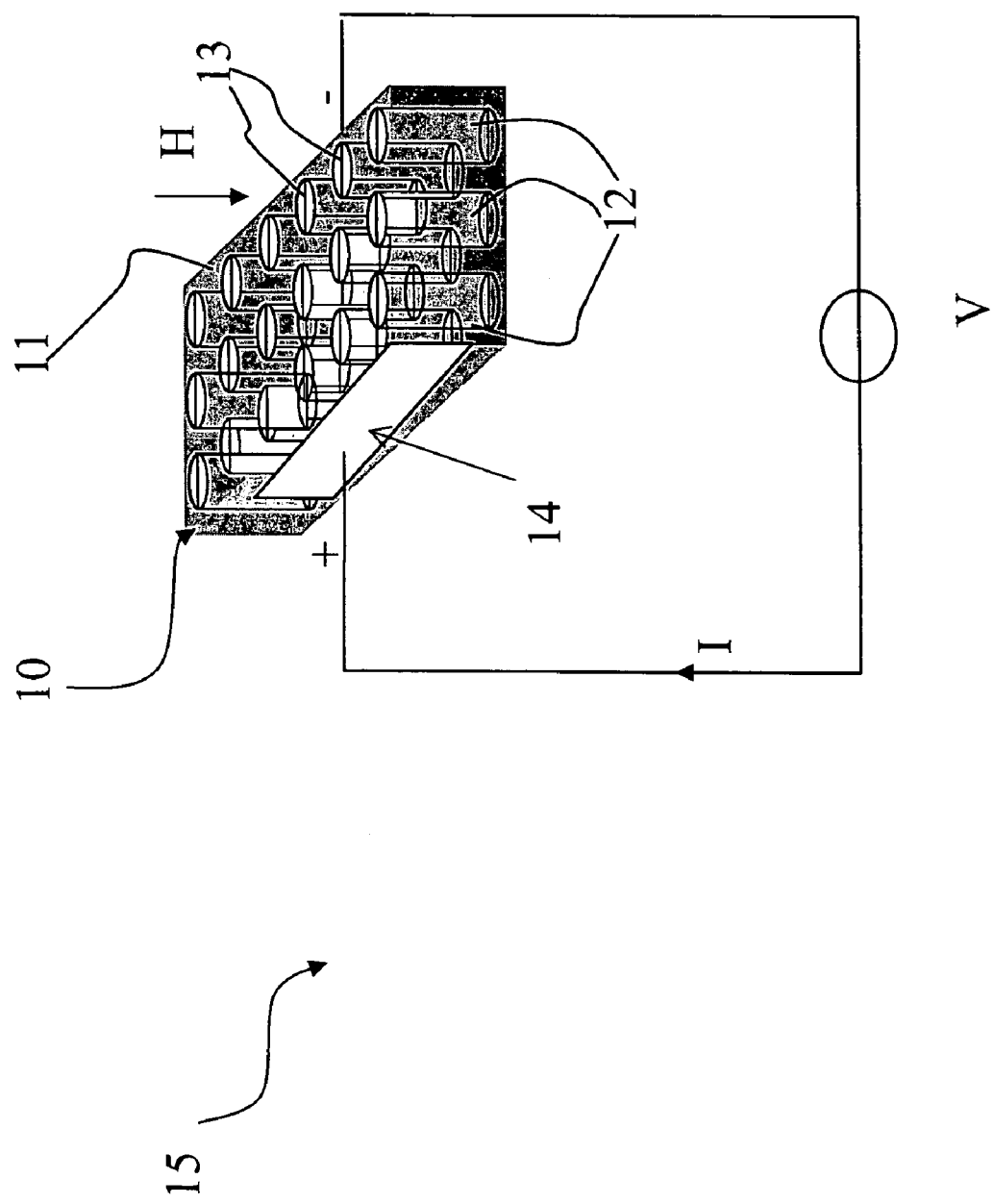
FIG. 2 represents a basic diagram of a magnetic field sensing device suitable for being employed in the monitoring system according to the invention.

According to an inventive aspect of the proposed monitoring system of the pressure, the sensor devices 114 are carried out through planar sensors of the type shown in FIG. 2, where a magnetoresistive element 10 is shown, forming part of a magnetic field sensing device, generally shown by numeral 15, obtained by metal deposition in the pores of a porous semiconductor. This magnetoresistive element 10 includes a semiconductor substrate 11, wherein pores 12 are located. Within the pores 12 there are metal material cylinders 13. To the semiconductor substrate 11, side electrodes 14 are applied. The semiconductor substrate 11 consists in a high mobility semiconductor, for example InAs. The operation of the device 15 is the following.

To the side electrodes 14 a V voltage is applied for determining a current I, which flows between the electrodes 14 and whose value is determined by the resistance of the magnetoresistive element 10. Said resistance is substantially due to the current flows through the metal cylinders 13, which have a lower resistance.

In the presence of an ;outer magnetic field H, because of the Lorentz force, a distribution of a spatial charge is produced in the cylinders 13, which causes an electric field tending to exclude the current passage therein. Therefore, the current value I which flows in the magnetoresistive element 10 is determined by the resistance of the semiconductor substrate 11, which is higher.

Therefore, the sensor 15 allows to detect a magnetic field H through the sudden variation, in particular the sudden reduction of the resistance of the magnetoresistive element 10.

The porous semiconductor material forming the substrate 11 is produced by a reactive ion etching technique, applied to a semiconductor wafer, while the metal constituting the cylinders 13 in the pores 12 is deposited by means of an electrochemical deposition method.

In the production of such magnetoresistive element 10, the method described in the Italian patent application no. TO2003A000604 in the same Applicant's name can be used, which provides for obtaining a magnetic field sensing device with a greater contact surface between semiconductor and metal, avoiding the formation of gaseous residues in the pores of the semiconductor substrate, through the progressive replacement of the electrolyte suitable for etching the semiconductor in order to produce the pores with the electrolyte containing the metal ions. In this way, the metal is deposited throughout the pore or nano-tube, by increasing the contact surface with the semiconductor. In this way, advantageously, the sensitivity and the dynamic range of the magnetic field sensing device which exploits the magnetoresistive element carried out by the manufacturing method just described are increased.

The magnetoresistive element of the magnetic field sensing device can be carried out by a disordered mesoscopic structure of metal nanoparticles in a semiconductor substrate with a high mobility and a narrow band gap, as described in the Italian patent application no. TO2003A000604 in the same Applicant's name.

Figure 3A:
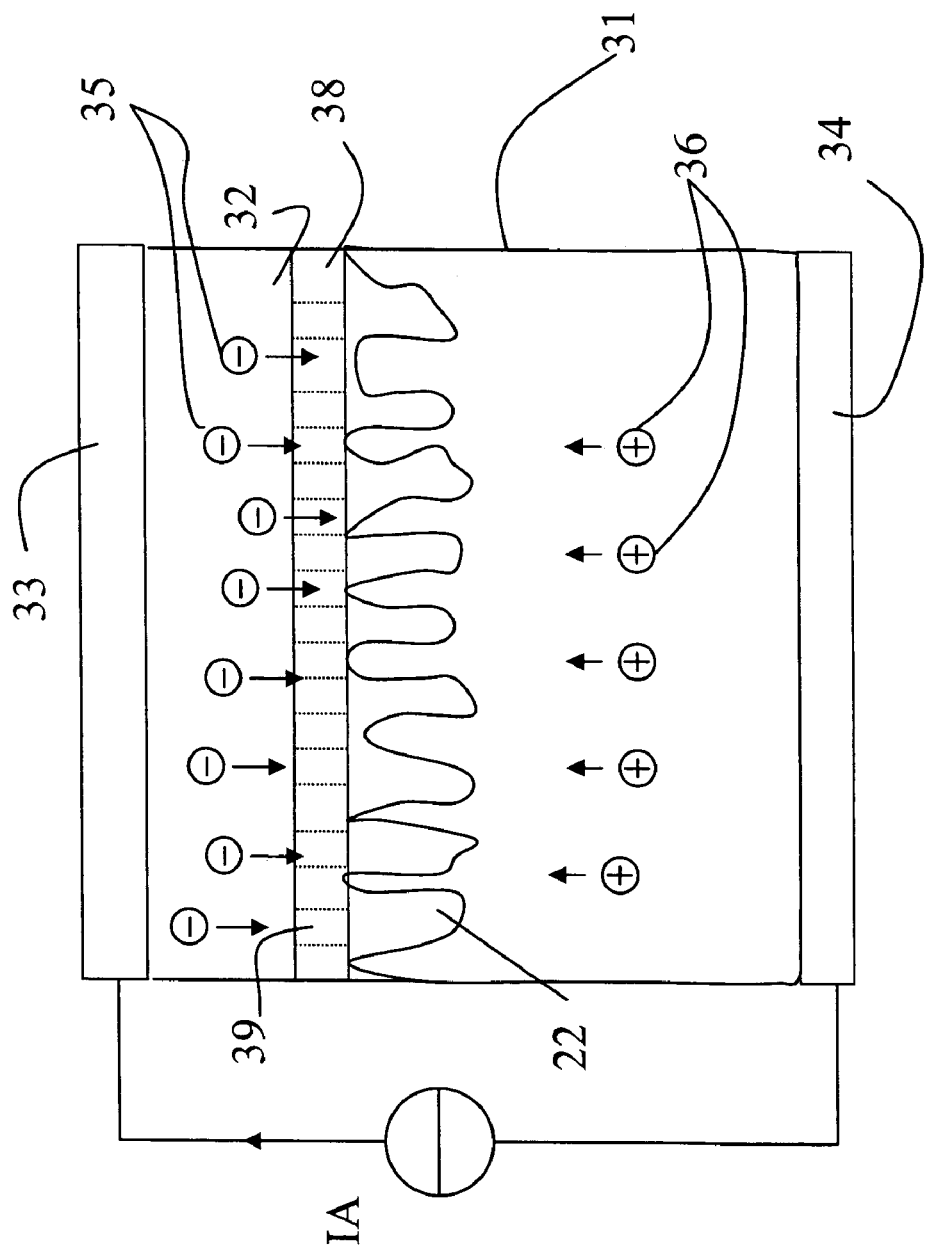

Therefore, referring to the FIGS. 3A, 3B and 3C, a manufacturing method of a magnetoresistive element 20, similar for purposes and operation to the magnetoresistive element 10 shown in FIG. 2, is proposed. This method, in a first step, provides for preparing nanoparticles or clusters of a metal material, by a synthesis process of metal colloids or other known synthesis process of metal nanoparticles. Such nanometal particles, shown by numeral 37 in FIG. 3B are, alternatively, also commercially available and can be simply purchased.

In a second step of the proposed manufacturing method, such metal nanoparticles are inserted mixed to a proper solvent in a solution 40. The solvent may be, by way of example, glycol or acetone.

A third step of the proposed method foresees to make porous a substrate of the semiconductor material 31. In a preferred embodiment, an anodized alumina template 38 is applied as a mask on the surface of the semiconductor substrate 31. Said anodized alumina template 38 is equipped, thank to the anodizing process at which it has been subjected, of nanometric pores 39, therefore it is possible to subsequently carry out spatially selective acid etches or etching, in particular by an acid etching of electrochemical type, through the pores 39 of the anodized alumina template 38.

In particular, a current IA is passed trough an acid electrolytic solution 32 between said semiconductor substrate 31, equipped with a back contact 34 which forms the anode, and a platinum filament 33, which forms the cathode. In the solution, the charge transport may only takes place if at the electrolyte/semiconductor interface there is a charge passage between a ion of the electrolytic solution 32, shown by numeral 35 in FIG. 3A, and positive ions 36 of the silicon substrate 31. This takes place by a chemical reaction which dissolves the anode, in the specific case the semiconductor substrate 31. As a result of this, pores 22 deeply develop in the substrate 31 by partially dissolving it.

In a preferred embodiment of the method, such etching is carried out until pores 22 are obtained, passing through the whole volume of the semiconductor substrate 31.

It is possible to further employ other nanoporous masks instead of the alumina, such as polymethylmethacrylate (PMMA) or polyimides.

A fourth step of the method, shown in FIG. 3B, foresees then to apply such solution 40 including metal nanoparticles 37 to the semiconductor substrate 31, now made porous, by a precipitation or capillary condensation process. The metal nanoparticles 37 enter by capillarity inside the pores of the nanoporous structure, while the liquid fraction of the solution evaporates, causing a capillary condensation phenomenon.

Alternatively, instead of the capillary precipitation or condensation it is possible to employ an electrochemical deposition method for depositing the metal nanoparticles 37 within the pores 22.

In a fifth step, a thermal annealing process is then carried out for the purpose of melting or aggregating said metal nanoparticles within a columnar structure or nanorod 23, shown in FIG. 3C, and decreasing the resistance thereof, by obtaining, a magnetoresistive element 20 consisting in a semiconductor porous die with pores 22 filled with metal material.

According to a further inventive aspect of the proposed method, the replacement of the electrolytic solution 32 in the third step with the solution 40 including the metal nanoparticles 37 takes place progressively, without uncovering the substrate surface 31, that is leaving enough electrolyte layer 32 to cover the pores 22, and then to avoid the ambient air or the gas entering therein. This would render difficult the deep penetration of the metal nanoparticles 37.

Subsequently, in a step not shown in the figures, the magnetoresistive element 20 is then equipped with side contacts, similar to those shown in FIG. 1, by a metal evaporation process.

The metal nanoparticles may be of any metal, such as gold, silver, aluminium, gallium, indium, copper, chromium, tin, nickel, iron, platinum, palladium, cobalt, tungsten, molybdenum, tantalum, titanium, permalloy, as well as other ferromagnetic alloys or other alloys with a conduction of a substantially metal type.

The semiconductor substrate 31 may be deposited upon any other insulating substrate, e.g. silicon or glass, by means of various methods, such as continuous or pulsed electrodeposition, electrochemical methods, simple precipitation, centrifugation, thermal evaporation or electron beam, simple sputtering or magnetron, CVD, PECVD, serigraphy.

The magnetic field sensing devices described with reference to FIGS. 2 and 3A, 3B, 3C are particularly compact, sensitive and strong, being carried out by means of micromachining techniques, which produce small size sensors, easy to embed within the tire compound or to apply on the rim or the internal surface of the tire itself.

According to a further aspect of the invention, such magnetic field sensing devices are suitable for being integrated in a wireless microsystem of a "stand alone" type, which does not need wires, as it communicates by radio the sensed data to a processing control unit and obtains the energy for its operation by the recycling of the vibrational energy taken from the wheel and/or automotive vehicle movement and stored in an integrated microbattery. Such microsystem can carry out, along with said processing control unit preferably placed in a remote way, a real sensing control unit, also including pressure sensors of the tire and/or temperature sensors and, in case, actuators or valves in order to restore the tire pressure, such control unit being located directly on the tire or the rim.

Figure 4:
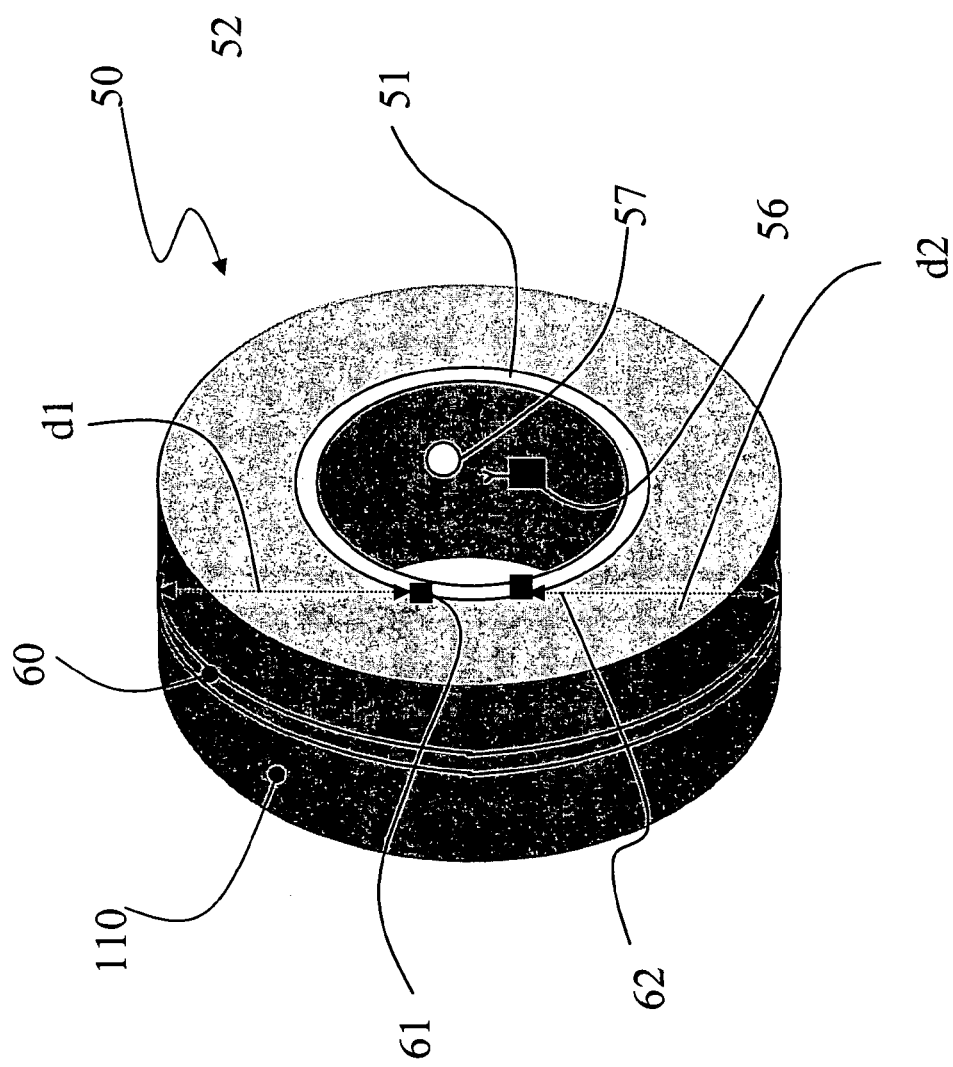
FIG. 4 represents a embodiment, variant of the monitoring system according to the invention.

In this regard, in FIG. 4 a monitoring and restoring pressure system is represented, which can be associated, in a "stand alone"-like microsystem just described, to the tire wear monitoring system, proposed for the purpose of carrying out a monitoring system of the physical properties of the tire.

Such a system for the monitoring and the pressure restoring of a tire, substantially foresees to position one or multiple pressure sensors upon the internal surface of the tire, or upon the rim surface of the wheel facing this tire, in particular inside the inner tube and restore the pressure by a magnetic micropump which withdraws air from the outside and insufflates it within the inner tube.

In a perspective view a wheel is then shown in FIG. 4, generally indicated by numeral 50, which includes a rim 51 and the tire 52 equipped with a tread 110 and an inner tube, not visible in the figure.

On the internal surface of the tire 52, a ferromagnetic material magnetic strip 60 is placed, which acts as a magnetic field source. This magnetic strip 60 may also be incorporated within the compound of the tire 52, more specifically within the compound of the tread 110, in particular in the form of ferromagnetic particles permanently magnetized during the production process of the tire 52 itself, in a similar way to what has been described regarding the magnetic particles 113 of FIG. 1.

A first magnetic field sensing device 61 and a second magnetic field sensing device 62 are firmly placed on the rim 51 at respective distances d1 and d2 from the magnetic strip 60.

Each of the two magnetic field sensing devices 61 and 62 works along a specific direction and returns an analog signal which is a function of the corresponding distance d1 or d2 from the magnetic strip 60, which forms the magnetic field source.

The magnetic field sensing devices 61 and 62 are placed in signal communication with a control unit 56 which, in the realization example of FIG. 4 is shown located in the tire 52 itself, and is suitable for communicating by radio with a further control unit placed in the car for processing the data about the running conditions of the car. The magnetic field sensing devices 61 and 62 communicate, for example, voltage values proportional to the intensity of the, magnetic field sensed. This control unit 56 is preferably combined for self-supplying, by converting the vibrational energy due to the movement of the wheel 52 into electric energy, to be stored in a microbattery, not shown.

Alternatively, the control unit may not include the part of the signals processing, which can be sent directly from the devices 61 and 62 by radio to a control unit in the car, but may include however the self-supplying part, for supplying the sensors and possible actuators, such a magnetic micropump 57, which will be described below.

In fact, the control unit 56 is also connected to such magnetic micropump 57, placed airtight flow-through between the inner tube, the tire 52, the rim 51 and the outside. The control unit 56 is combined for comparing the signals coming from the two magnetic field sensing devices 61 and 62, with alarm thresholds. In particular, it is provided for operating the difference instant by instant, during the rotation of the tire 52, between the signals given by said two magnetic field sensing devices 61 and 62, and to compare the absolute value thereof with a pressure threshold $P_{th}$, thus obtaining the pressure value of the tire 52.

The employed magnetic field sensing devices 61 and 62 preferably correspond to the magnetic field sensing devices of FIGS. 2, 3A, 3B and 3C, even if it is possible to employ other kinds of sensor devices of the magnetic field gradient and Hall sensors.

The control unit 56 may be shared with the tire wear monitoring system of FIG. 1, by receiving and processing also the signals of the magnetic field sensing devices 114.

In an alternative embodiment of the monitoring and pressure restoring system of a tire shown in FIG. 4, it is possible to apply the magnetic field sensing devices 61 and 62 on a fixed part of the car, not integral to the wheel 50. In this case, the signals received by the control unit 56 will vary in a periodic way with the wheel rotation and, in case, it will be necessary to consider the mean value of these signals or their difference for the comparison with the alarm thresholds.

The just described solution allows to achieve considerable advantages with respect to the known solutions.

The wear monitoring system according to the invention advantageously places the magnetic field sensing devices within the wheel, in particular inside the tire, by eliminating or greatly reducing the distance from the magnetic field source. In this way, the sensitivity and the strength relative to any interferences are considerably increased.

Advantageously, the sensing devices proposed in association with the system according to the invention work on a wider field of distances than, for example, Hall-type sensors.

Further, the use of sensing devices manufactured by means of deposition techniques of composite or porous layers is particularly suitable in a system which places the sensitive elements to the magnetic field directly on the moving wheel. Such magnetic field sensing devices are, in fact, compact and strong and are also economic to produce, so it is possible to think about inserting a plurality of such devices within the tire and obtaining a very accurate and reliable tire wear monitoring system.

Further, such devices are prone to limited consumptions and are then particularly suitable for the use in stand-alone Microsystems.

Obviously, without prejudice to the principle of the invention, construction details and embodiments could widely vary with respect to what has been described and shown by mere way of example, however without leaving the ambit of the present invention.

For example, it will also be possible to employ different magnetic field sensing devices, such as Hall sensors, whose response is a function of the field intensity that one wishes to measure and which are suitable for being located together with the wheel.

The invention claimed is:

1. Tire wear monitoring system, including a wearing part to be monitored, said wearing part being associated with magnetic elements and magnetic field sensing means, for sensing an intensity of a magnetic field emitted by said magnetic elements, associated with said wearing part of said tire,
   wherein said magnetic field sensing means for sensing an intensity of a magnetic field emitted by said magnetic elements are associated with a wheel to which said tire belongs, and
   wherein the wearing part comprises tire tread with magnetic particles inserted therein that act as the magnetic elements.

2. System according to claim 1, wherein said magnetic field sensing means for sensing an intensity of a magnetic field emitted by said magnetic elements are associated with a rim of said wheel.

3. System according to claim 1, wherein said magnetic field sensing means for sensing an intensity of a magnetic field emitted by said magnetic elements are associated with the tire of said wheel.

4. System according to claim 3, wherein said magnetic field sensing means for sensing an intensity of a magnetic field emitted by said magnetic elements are inserted close to the wearing part of said tire.

5. System according to claim 3, wherein said magnetic field sensing means for sensing an intensity of a magnetic field emitted by said magnetic elements are applied to the internal part of said tire.

6. System according to claim 4, wherein said magnetic field sensing means for sensing an intensity of a magnetic field emitted by said magnetic elements are located close to blocks of said wearing part of the tire.

7. System according to claim 1, wherein said magnetic field sensing means include one or multiple sensors comprising magnetoresistive elements suitable for varying their resistance in correspondence with the intensity variation of the magnetic field generated by said magnetic elements.

8. System according to claim 7, wherein said magnetoresistive element includes metal conduction regions, comprised of metal nanoparticles, and semiconductive conduction regions in a configuration of disordered mesoscopic structure.

9. System according to claim 7, wherein said magnetoresistive element includes pores in a semiconductor substrate, metal being deposited in said pores.

10. System according to claim 1, wherein in that said magnetic elements are substantially located in correspondence with blocks of said wearing part.

11. Monitoring system of the physical properties of a tire, wherein the system includes a control unit in a signal communication relation with sensing means of said physical properties and conversion means of the vibrational energy associated with the tire motion, in electric energy, and
wherein said sensing means of physical properties include the magnetic elements and the magnetic sensing devices configured according to the system according to claim 1.

12. System according to claim 11, wherein said sensing means of physical properties include one or multiple magnetic sensing devices placed to predetermined distances from a magnetic element associated with a region of the tire for measuring the pressure thereof.

13. System according to claim 12, wherein said magnetic sensing devices include one or multiple sensors including magnetoresistive elements suitable for varying their resistance in correspondence with the intensity variation of the magnetic field generated by the variation of said predetermined distances from a magnetic element associated with a region of the tire for measuring the pressure thereof.

14. System according to claim 13, wherein said magnetoresistive element includes metal conduction regions, comprised of metal nanoparticles and semiconductive conduction regions in a configuration of disordered mesoscopic structure.

15. System according to claim 14, wherein said magnetoresistive element includes pores in a semiconductor substrate, metal being deposited in said pores.

16. Tire wear monitoring system, including a wearing part to be monitored, said wearing part being associated with magnetic elements and magnetic field sensing means, for sensing an intensity of a magnetic field emitted by said magnetic elements, associated with said wearing part of said tire,
wherein said magnetic field sensing means for sensing an intensity of a magnetic field emitted by said magnetic elements are associated with a wheel to which said tire belongs,
wherein the magnetic elements are inserted into the wearing part, and
wherein the magnetic field sensing means are inserted into the wearing part.

17. System according to claim 16, wherein the wearing part comprises tire tread, and the magnetic elements and the magnetic field sensing means are located in the tire tread.

18. System according to claim 17, wherein the magnetic elements are substantially located in correspondence with blocks of the wearing part.

19. System according to claim 18, wherein the blocks have centered vertical axes sections, and wherein the magnetic field sensing devices measure the intensity variation of the magnetic field along the sections.

20. System according to claim 16, wherein said magnetic field sensing means for sensing an intensity of a magnetic field emitted by said magnetic elements are associated with a rim of said wheel.

21. System according to claim 16, wherein said magnetic field sensing means for sensing an intensity of a magnetic field emitted by said magnetic elements are associated with the tire of said wheel.

22. System according to claim 21, wherein said magnetic field sensing means for sensing an intensity of a magnetic field emitted by said magnetic elements are inserted close to the wearing part of said tire.

23. System according to claim 16, wherein said magnetic field sensing means include one or multiple sensors comprising magnetoresistive elements suitable for varying their resistance in correspondence with the intensity variation of the magnetic field generated by said magnetic elements.

24. System according to claim 23, wherein said magnetoresistive element includes metal conduction regions, comprised of metal nanoparticles, and semiconductive conduction regions in a configuration of disordered mesoscopic structure.

25. System according to claim 23, wherein said magnetoresistive element includes pores in a semiconductor substrate, metal being deposited in said pores.

* * * * *